(12) United States Patent
Tsuchiya et al.

(10) Patent No.: US 8,510,452 B2
(45) Date of Patent: Aug. 13, 2013

(54) WIRELESS NETWORK SELECTION APPARATUS

(75) Inventors: Hitoshi Tsuchiya, Tokyo (JP); Kazuyuki Shibuya, Sagamihara (JP); Akihiko Sakamoto, Tokyo (JP)

(73) Assignee: Olympus Corporation, Tokyo (JP)

( * ) Notice: Subject to any disclaimer, the term of this patent is extended or adjusted under 35 U.S.C. 154(b) by 213 days.

(21) Appl. No.: 12/870,255

(22) Filed: Aug. 27, 2010

(65) Prior Publication Data

US 2011/0058536 A1 Mar. 10, 2011

(30) Foreign Application Priority Data

Sep. 10, 2009 (JP) ................................ 2009-209148

(51) Int. Cl.
*G06F 15/16* (2006.01)

(52) U.S. Cl.
USPC ........ 709/227; 709/228; 709/229; 370/395.2; 370/395.3; 370/328; 370/329

(58) Field of Classification Search
USPC ........... 709/227, 228, 229; 370/395.2, 395.3, 370/328, 329
See application file for complete search history.

(56) References Cited

U.S. PATENT DOCUMENTS

| | | | | |
|---|---|---|---|---|
| 7,277,932 B2 * | 10/2007 | Adachi et al. | ................. | 709/220 |
| 7,389,352 B2 * | 6/2008 | Cromer et al. | ................. | 709/227 |
| 7,756,980 B2 * | 7/2010 | Bernstein et al. | ............. | 709/227 |
| 8,131,859 B2 * | 3/2012 | Fujii et al. | ..................... | 709/228 |
| 8,238,238 B2 * | 8/2012 | Baron et al. | ................... | 370/230 |
| 2004/0259552 A1 * | 12/2004 | Ihori et al. | .................... | 455/445 |
| 2005/0148326 A1 * | 7/2005 | Nogawa et al. | ............... | 455/420 |
| 2006/0187890 A1 * | 8/2006 | Lin | ............................... | 370/338 |
| 2006/0200564 A1 * | 9/2006 | Watanabe et al. | ............. | 709/227 |
| 2006/0206592 A1 * | 9/2006 | Fujii et al. | ..................... | 709/220 |
| 2008/0026764 A1 * | 1/2008 | Shimura et al. | ................ | 455/446 |
| 2010/0020746 A1 * | 1/2010 | Zaks | ............................. | 370/328 |
| 2010/0228868 A1 * | 9/2010 | Sakai | ............................ | 709/228 |
| 2010/0312895 A1 * | 12/2010 | Fujii | ............................. | 709/226 |
| 2011/0029680 A1 * | 2/2011 | Goto | ............................. | 709/228 |
| 2011/0085447 A1 * | 4/2011 | Kholaif et al. | ................. | 370/242 |

FOREIGN PATENT DOCUMENTS

| | | |
|---|---|---|
| JP | 2004-215232 A | 7/2004 |
| JP | 2006-254077 A | 9/2006 |
| JP | 2008-213294 A | 9/2008 |
| JP | 2008-252787 A | 10/2008 |
| JP | 2008-283422 A | 11/2008 |
| WO | 2008/021077 A2 | 2/2008 |

OTHER PUBLICATIONS

Japanese Office Action dated Apr. 16, 2013, issued in corresponding Japanese Patent Application No. 2009-209148, with English translation (8 pages).

* cited by examiner

*Primary Examiner* — Tauqir Hussain
(74) *Attorney, Agent, or Firm* — Westerman, Hattori, Daniels & Adrian, LLP

(57) ABSTRACT

A wireless network selection apparatus comprises a storage unit, a transmitting unit, a first receiving unit, and a second receiving unit. The storage unit stores first connection setting information to join a first wireless network and second connection setting information to join a second wireless network which is different from the first wireless network. The transmitting unit transmits the first connection setting information or the second connection setting information to an external communication terminal. The first receiving unit receives a request to transmit the first connection setting information transmitted from the transmitting unit. The second receiving unit is provided in the same housing as that in which the first receiving unit is provided and receives a request to transmit the second connection setting information transmitted from the transmitting unit.

5 Claims, 8 Drawing Sheets

US 8,510,452 B2

WIRELESS NETWORK SELECTION APPARATUS

BACKGROUND OF THE INVENTION

1. Field of the Invention

The present invention relates to a wireless network selection apparatus that selects a wanted wireless network from a plurality of wireless networks and establishes connection to the selected wireless network, when it is connected to the wireless network.

Priority is claimed on Japanese Patent Application No. 2009-209148, filed Sep. 10, 2009, the content of which is incorporated herein by reference.

2. Description of Related Art

In recent years, WPS (Wi-fi Protected Setup) has been widely spread as a standard for simply setting connection to a wireless LAN (Local Area Network). An example of the WPS system is PBC (Push Button Configuration). In PBC, buttons for establishing a connection are provided on both the terminal to be connected to the wireless LAN and the access point (for example, a router) and the user pushes both buttons to automatically set the connection of the terminal whose button is pushed to the wireless LAN. A technique for pushing a button to set connection to a wireless LAN is disclosed in, for example, Japanese Unexamined Patent Application, First Publication No. 2004-215232.

There are two kinds of wireless LAN connection modes. One is the infrastructure mode in which terminals are connected to each other through an access point and the other is the ad-hoc mode in which terminals are directly connected to each other. PBC which is given as an example relates to a connection set by the WPS in infrastructure mode.

SUMMARY OF THE INVENTION

In one aspect of the present invention, there is provided a wireless network selection apparatus that includes at least: a storage unit which stores first connection setting information to join a first wireless network and second connection setting information to join a second wireless network which is different from the first wireless network; a transmitting unit which transmits the first connection setting information or the second connection setting information to an external communication terminal; a first receiving unit which receives a request to transmit the first connection setting information transmitted from the transmitting unit; and a second receiving unit which is provided in the same housing as that in which the first receiving unit is provided and receives a request to transmit the second connection setting information transmitted from the transmitting unit.

Preferably, the wireless network selection apparatus may further comprise: a first display unit which displays first additional information corresponding to the first wireless network; and a second display unit which is provided in the same housing as that in which the first display unit is provided and displays second additional information corresponding to the second wireless network, wherein the storage unit stores the first additional information and the second additional information, and the first receiving unit and the second receiving unit receive the transmission request by detecting an operation of the user.

Preferably, the wireless network selection apparatus may further comprise: a wireless network detecting unit which detects a peripheral wireless network; and a setting unit which, when the wireless network detecting unit detects a wireless network, sets connection setting information corresponding to the wireless network in the connection setting information stored in the storage unit such that the connection setting information can be selected.

Preferably, the wireless network selection apparatus may further comprise: a first display unit which displays a first unique code corresponding to the first wireless network; and a second display unit which is provided in the same housing as that in which the first display unit is provided and displays a second unique code corresponding to the second wireless network, wherein the storage unit stores the first unique code and the second unique code, the first receiving unit and the second receiving unit receive a transmission request and a code from the external communication terminal, the transmitting unit, when the code received by the first receiving unit is identical to the first unique code, transmits the first connection setting information to the external communication terminal, and the transmitting unit, when the code received by the second receiving unit is identical to the second unique code, transmits the second connection setting information to the external communication terminal.

Preferably, the first display unit may display the first additional information corresponding to the first wireless network, and the second display unit may display the second additional information corresponding to the second wireless network.

Preferably, the wireless network selection apparatus may further comprise a connection setting request unit which requests the external communication terminal forming a wireless network to transmit connection setting information of the wireless network and acquires the connection setting information, wherein the storage unit stores the connection setting information acquired by the connection setting request unit as the first connection setting information or the second connection setting information.

BRIEF DESCRIPTION OF THE DRAWINGS

The above features and advantages of the present invention will be more apparent from the following detailed description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, embodiments of the present invention will be described with reference to the drawings.

(First Embodiment)

Figure 1:
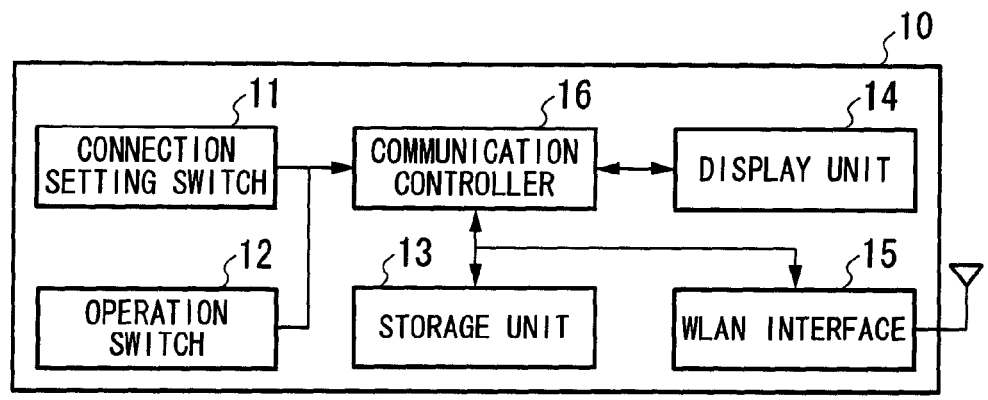
FIG. 1 is a block diagram illustrating the structure of a wireless network selection apparatus according to a first embodiment.

First, a first embodiment of the invention will be described. FIG. 1 shows the structure of a wireless network selection apparatus 10 according to this embodiment. The wireless network selection apparatus 10 includes a connection setting switch 11, an operation switch 12, a storage unit 13, a display unit 14, and a WLAN interface 15, and a communication controller 16 in the same housing.

The connection setting switch 11 generates a trigger for starting the connection setting of a wireless network. The connection setting switch 11 detects a push operation of the user and generates the trigger. In this embodiment, it is assumed that the connection setting is performed by PBC. Alternatively, the connection setting may be performed by a unit for inputting a PIN code (entry code). In this case, it is assumed that, when an operation indicating that the input of the PIN code has been completed is performed, the connection setting switch 11 is operated. The connection setting switch 11 may generate an individual trigger for each wireless network.

The operation switch 12 selects a wireless network to which the user wants to be connected. The storage unit 13 stores connection setting information for participating in the wireless network and the additional information of the wireless network so as to be associated with each other. The connection setting information includes encryption scheme information or encryption key (for example, a WEP key or a Phrase ID) information. The additional information of the wireless network helps the user select the wireless network and includes, for example, an identification code (SSID) of the wireless network, the wireless network name, information related to the person who has authority to join the wireless network, the purpose of use, and participation conditions.

The display unit 14 displays, for example, the information of the wireless network stored in the storage unit 13 or a menu screen for operation. The WLAN interface 15 transmits or receives data or information related to the wireless connection to or from an external communication terminal using wireless communication. The communication controller 16 controls the sequence for setting a wireless network connection and also controls the operation of each unit, for example, the display of the display unit 14 and communication with the outside.

Figure 2:
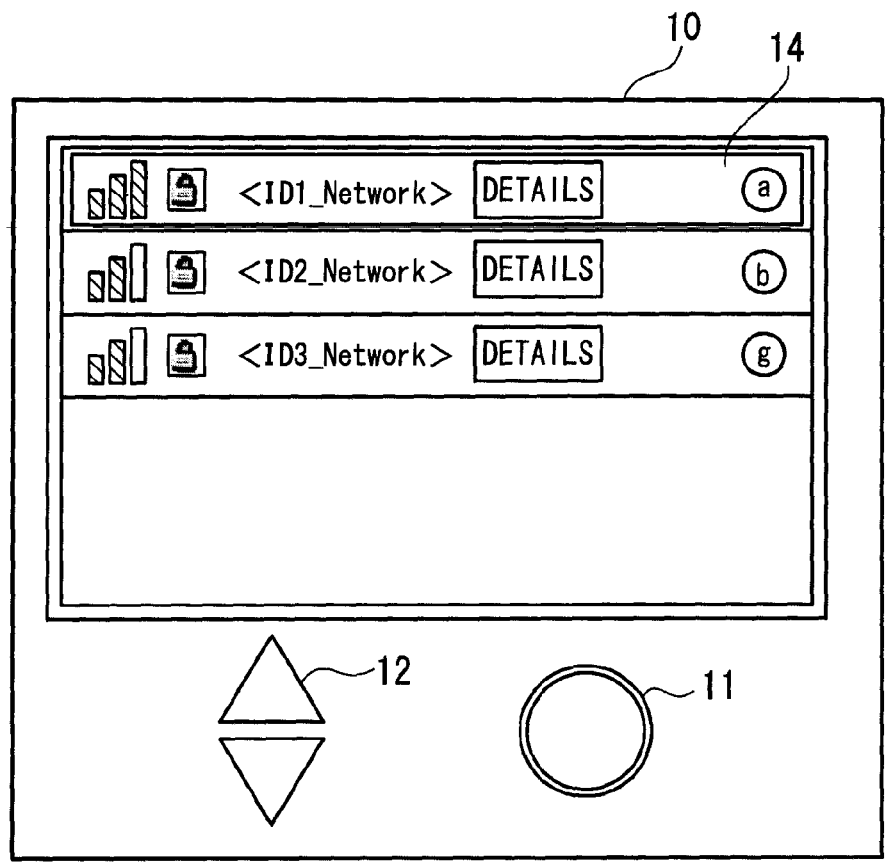
FIG. 2 is a diagram illustrating a display screen of the wireless network selection apparatus according to the first embodiment.

FIG. 2 shows an example of the display of the wireless network selection apparatus 10 shown in FIG. 1. In the example shown in FIG. 2, there are three wireless networks around the wireless network selection apparatus, and an SSID, a radio wave state, and a communication standard are displayed on the display unit 14. The user operates the operation switch 12 to select a wanted wireless network and pushes the connection setting switch 11 to start the wireless connection setting of the selected wireless network while viewing the screen.

Figure 3:
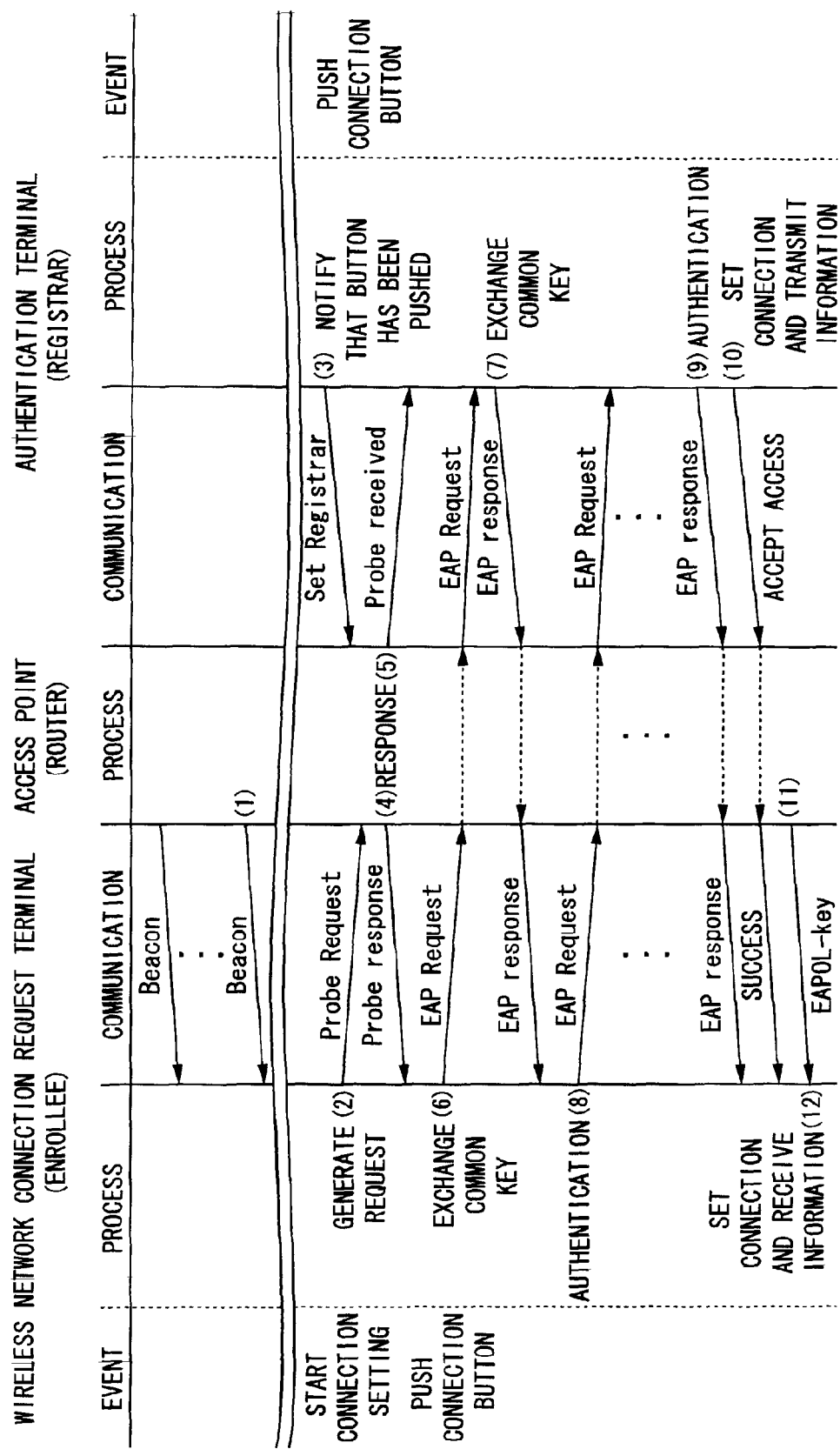
FIG. 3 is a sequence diagram illustrating the procedure of a process and communication related to a wireless connection setting in the first embodiment.

FIG. 3 shows a process and communication related to wireless connection setting according to the WPS standard. In many cases, in the wireless connection setting by WPS, a registrar, which is an authentication terminal, and a router, which is an access point, are integrated with each other. However, in FIG. 3, the registrar and the access point are individually provided. The wireless network selection apparatus according to this embodiment has the function of an authentication terminal, but does not have the function of a router. Therefore, the wireless network selection apparatus performs wireless connection setting through the router in the infrastructure mode. It is assumed that an enrollee requesting a connection to the wireless network is a wireless communication terminal is trying to join the wireless network.

The wireless network selection apparatus 10 operates as a registrar to authenticate a wireless communication terminal and then transmits wireless network connection setting information to the wireless communication terminal by the process and communication shown in FIG. 3. The wireless communication terminal receives the connection setting information and performs wireless connection setting according to the connection setting information. In this way, the wireless communication terminal can join the wireless network. It is assumed that the position of the wireless network selection apparatus 10 has been known and the user can operate the wireless network selection apparatus 10 and the wireless communication terminal that is desired to be subjected to wireless network connection setting to perform the connection setting of the wireless communication terminal.

Next, the procedure of the process and communication shown in FIG. 3 will be described. The router periodically transmits a beacon indicating the presence of the router (Step (1)). In the wireless communication terminal that is operated as an enrollee requesting a connection to the wireless network, the user operates the connection setting switch to direct the start of connection setting. The wireless communication terminal receiving the direction to start connection setting transmits a probe request, which is a request to join the wireless network, to the router, which is a beacon transmission source (Step (2)). When receiving the beacons from a plurality of wireless networks, the wireless communication terminal transmits the probe request to all of the wireless networks.

In the wireless network selection apparatus 10, as shown in FIG. 2, information about selectable wireless networks is displayed on the display unit 14. The user operates the connection setting switch 11 of the wireless network selection apparatus 10 to select a wireless network that the user wants to join. The connection setting switch 11 detects the selected wireless network and outputs a signal to the communication controller 16. The communication controller 16 transmits information indicating that the wireless network selection apparatus has become a registrar to the router through the WLAN interface 15 (Step (3)).

The router receiving the probe request returns a probe response to the wireless communication terminal. At that time, when the router is notified that the wireless network selection apparatus has become a registrar, the probe response including the information indicating that the wireless network selection apparatus has become a registrar returns to the router. However, if not, a probe response including information indicating that the wireless network selection apparatus has not become a registrar returns to the router (Step (4)).

The router transmits information indicating the reception of the probe request to the wireless network selection apparatus 10 notifying the router that the wireless network selection apparatus has become a registrar (Step (5)). The wireless communication terminal receiving the probe response including the information indicating that the wireless network selection apparatus has become a registrar exchanges an encryption key with the wireless network selection apparatus 10, which is a registrar, through the router (Steps (6) and (7)) and performs authentication (Steps (8) and (9)) through the router. When receiving the probe response including the information indicating that the wireless network selection apparatus has not become a registrar, the wireless communication terminal transmits the probe request again.

When authentication is completed, the wireless network selection apparatus 10 notifies the router that authentication has been completed, and the router receiving the notification notifies the wireless communication terminal that authentication has succeeded (Step (10)). Then, the router transmits an EAPOL-Key including connection setting information required for wireless connection to the wireless communication terminal (Step (11)). When receiving the EAPOL-Key, the wireless communication terminal acquires the connection setting information and stores the acquired connection setting information in the internal memory. The wireless connection is set according to the connection setting information such that the wireless communication terminal can join the user's wanted wireless network.

Figure 4:
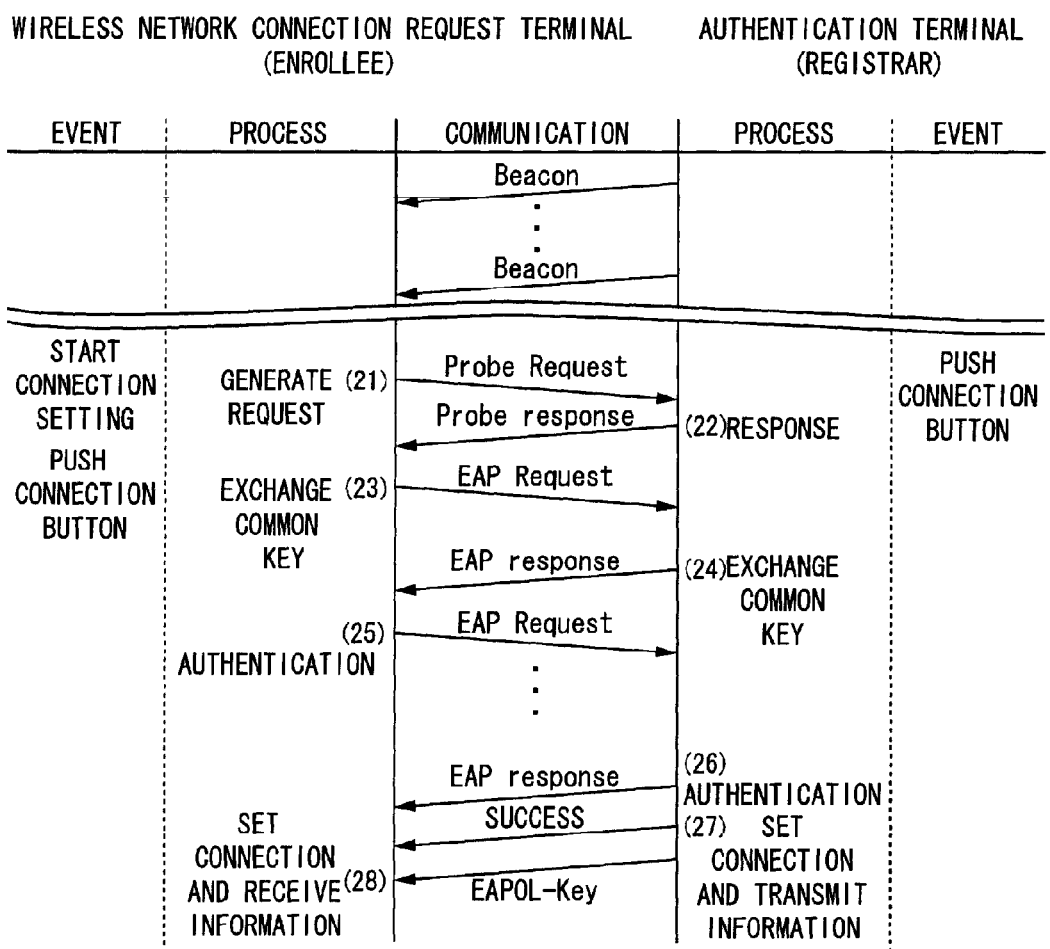
FIG. 4 is a sequence diagram illustrating the procedure of a process and communication related to wireless connection setting in the first embodiment.

FIG. 4 is shows the procedure of the process and communication related to a wireless connection setting according to the WPS standard. In FIG. 4, the registrar and the enrollee directly communicate with each other to set wireless connection. The wireless network selection apparatus 10 needs to acquire connection setting information at the beginning. In this case, the wireless network selection apparatus 10 is operated as an enrollee and the process and communication shown in FIG. 4 are performed between the wireless network selection apparatus 10 and the router. Hereinafter, the connection setting between the wireless network selection apparatus 10 and the router is assumed and described.

Next, the procedure of the process and communication shown in FIG. 4 will be described. First, the router serving as a registrar periodically generates a beacon. In the wireless network selection apparatus 10 serving as an enrollee that requires a connection to the network, for example, the administrator of the wireless network selection apparatus 10 operates the connection setting switch 11 to direct the start of connection setting. The connection setting switch 11 detects that the start of connection setting is directed and outputs a signal to the communication controller 16. The communication controller 16 transmits a probe request, which is a request to join the wireless network, to the router, which is a beacon transmission source, through the WLAN interface 15 (Step (21)). When receiving the beacons from a plurality of wireless networks, the probe request is transmitted to all of the wireless networks.

For example, the administrator of the wireless network selection apparatus 10 operates the connection setting switch of the router. When the connection setting switch is operated, the router receiving the probe request transmits a probe response including information indicating that the router has become a registrar to the wireless network selection apparatus 10 (Step (22)). When the connection setting switch is not operated, the router returns a probe response including information indicating that the router has not become a registrar.

In the wireless network selection apparatus 10, the communication controller 16 receives the probe response through the WLAN interface 15. After receiving the probe response including the information indicating that the router has become a registrar, the communication controller 16 exchanges an encryption key with the wireless communication terminal (Steps (23) and (24)) or performs authentication (Steps (25) and (26)). When receiving the probe response including the information indicating that the router has not become a registrar, the communication controller 16 transmits the probe request again.

When authentication is completed, the router notifies the wireless network selection apparatus 10 that authentication has been completed (Step (27)). Then, the router transmits the EAPOL-Key including connection setting information required for wireless connection to the wireless network selection apparatus 10 (Step (28)). In the wireless network selection apparatus 10, the communication controller 16 receives the EAPOL-Key through the WLAN interface 15, acquires the connection setting information, and stores the acquired connection setting information in the storage unit 13. Before the process and communication shown in FIG. 3 are performed, the wireless network selection apparatus 10 performs the process and communication shown in FIG. 4 to acquire connection setting information required to join the wireless network. The additional information of the wireless network and the connection setting information may be acquired at the same time. Alternatively, in the wireless network selection apparatus 10, for example, the administrator of the wireless network selection apparatus 10 may input necessary additional information.

Figure 5:
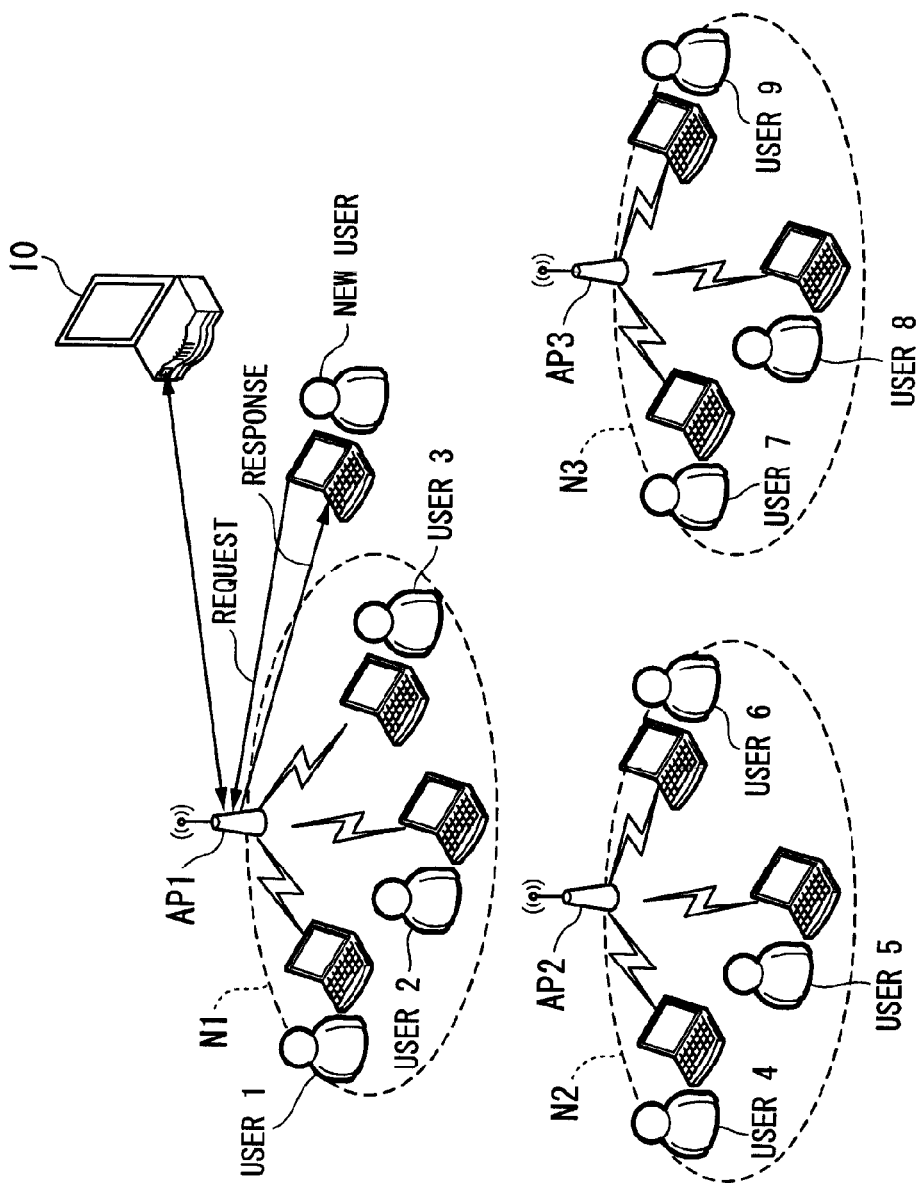
FIG. 5 is a network configuration diagram illustrating the usage of the wireless network selection apparatus according to the first embodiment.
Figure 6:
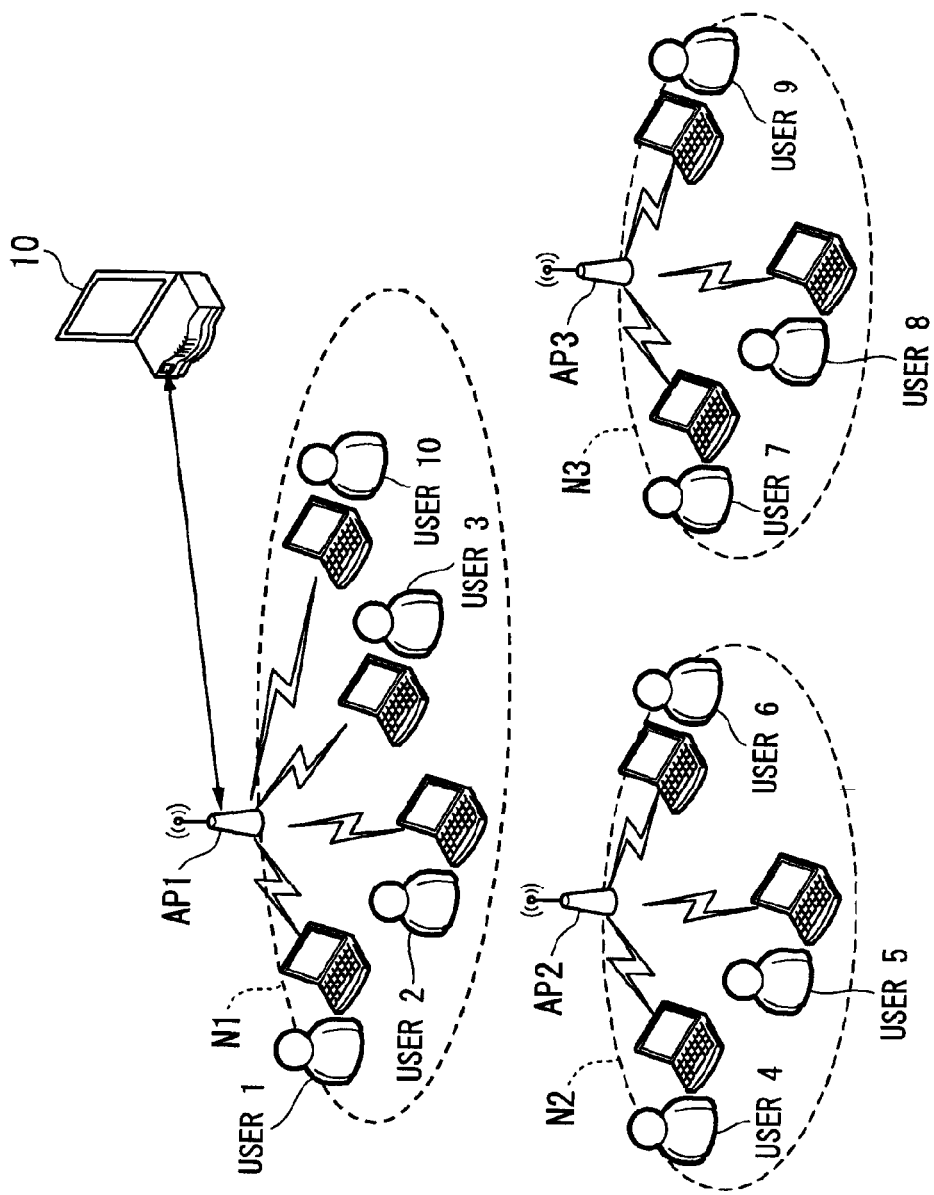
FIG. 6 is a network configuration diagram illustrating the usage of the wireless network selection apparatus according to the first embodiment.

FIGS. 5 and 6 show the usage of the wireless network selection apparatus according to the first embodiment. It is assumed that there are three access points (AP1, AP2, and AP3) around the wireless network selection apparatus 10 and the three access points form wireless networks (N1, N2, and N3) in the infrastructure mode, respectively. A new user sets the connection of the user's wireless communication terminal to one of the wireless networks which the wireless communication terminal joins. FIG. 5 shows a situation before connection setting, and FIG. 6 shows a situation after connection setting.

Each of the access points AP1 to AP3 is registered in the wireless network selection apparatus 10 in advance. That is, the wireless network selection apparatus 10 acquires the connection setting information of the wireless networks N1 to N3 from the access points AP1 to AP3 in advance. For example, when the administrator of the wireless network selection apparatus 10 pushes the connection setting switches of both the wireless network selection apparatus 10 and the APs, the wireless network selection apparatus 10 acquires wireless network setting information and is allocated with IP addresses by the access points according to the sequence shown in FIG. 4. In this case, the wireless network selection apparatus 10 has the connection setting information of three wireless networks and three IP addresses.

Hereinafter, it is assumed that a new user wants to join the wireless network N1. When the new user operates the wireless network selection apparatus 10 to select the wireless network N1 and pushes the connection setting switch 11, the wireless network selection apparatus 10 notifies the access point AP1 that the wireless network selection apparatus 10 has become a registrar. When the new user pushes the connection setting switch of the user's wireless communication terminal, the wireless communication terminal continuously transmits a connection request to the peripheral access points for a predetermined amount of time. When receiving the information indicating that the wireless network selection apparatus has become a registrar, the access point returns a response indicating that connection setting can start. Since the access point AP1 is notified that the wireless network selection apparatus has become a registrar, the access point AP1 returns a response indicating that connection setting is possible. However, the access points AP2 and AP3 return a response indicating that a connection setting is not possible.

Then, the wireless network selection apparatus 10 and the wireless communication terminal of the new user exchange connection setting information through the access point AP1. Then, as shown in FIG. 6, the wireless communication terminal of the new user is connected as user 10 to the network N1.

As described above, according to this embodiment, even though there is a plurality of wireless networks around the wireless communication terminal that wants to be connected to the wireless network, the wireless communication terminal can select a wanted wireless network in one place in which there is the wireless network selection apparatus 10 and perform connection setting. Therefore, the user does not need to find the access point of a wanted wireless network and perform connection setting.

In the wireless network selection apparatus 10, as shown in FIG. 2, since various kinds of information of a plurality of wireless networks to which the wireless communication terminal can be connected are displayed, the user can select a wireless network that the user wants to be connected to and perform connection setting. Therefore, the user does not need to view a plurality of display devices, but can view one display device to select a wanted network.

As shown in FIG. 4, the wireless network selection apparatus 10 requests the wireless communication terminal (in this embodiment, the router) forming the wireless network to transmit wireless network connection setting information and acquires it. Therefore, for example, the administrator of the wireless network selection apparatus 10 does not need to input connection setting information related to the wireless networks that can be selected by the wireless network selection apparatus 10.

(Second Embodiment)

Figure 7:
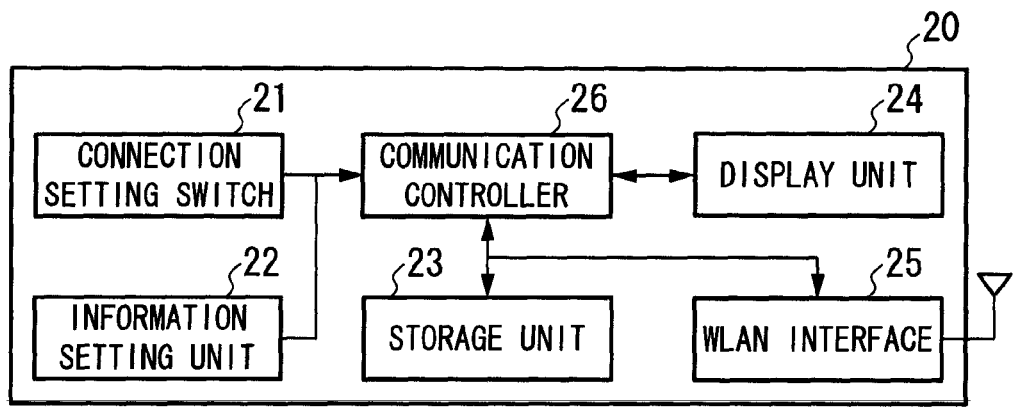
FIG. 7 is a block diagram illustrating the structure of a wireless network selection apparatus according to a second embodiment.

Next, a second embodiment of the invention will be described. FIG. 7 shows the structure of a wireless network selection apparatus 20 according to this embodiment. The wireless network selection apparatus 20 includes a connection setting switch 21, an information setting unit 22, a storage unit 23, a display unit 24, a WLAN interface 25, and a communication controller 26 in the same housing.

The connection setting switch 21 has the same function as the connection setting switch 11 according to the first embodiment, but is used to input a PIN code in this embodiment. When the connection setting switch 21 is operated and the input of the PIN code is completed, the connection setting switch 21 is in the same state as that in which the connection setting switch 11 according to the first embodiment is pushed. The communication controller 26 controls the operation of each unit, such as the display of the display unit 24 and communication with the outside, in addition to a sequence for setting wireless network connection, and generates a PIN code unique to the wireless network.

The information setting unit 22 is for inputting the additional information of the wireless network. The storage unit 23 stores wireless network connection setting information and also stores additional information input by the information setting unit 22 so as to be associated with the connection setting information and the PIN code, similar to the storage unit 13 according to the first embodiment.

The display unit 24 displays the information of the wireless network or the PIN code stored in the storage unit 23 and a menu screen for operation. The WLAN interface 25 transmits or receives data or information related to the wireless connection to or from an external communication terminal using wireless communication.

In this embodiment, it is assumed that connection setting is performed in the ad-hoc mode. A process and communication related to the connection setting are performed according to the procedure shown in FIG. 4. Next, the usage of the wireless network selection apparatus (FIG. 8) and the flow of a connection setting process according to this embodiment will be described.

Figure 8:
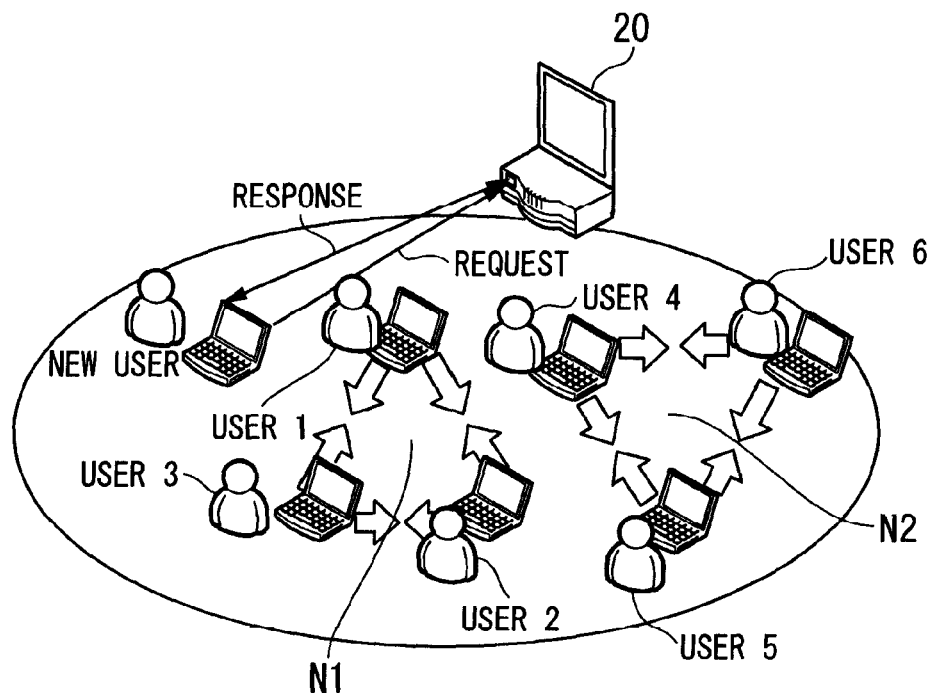
FIG. 8 is a network configuration diagram illustrating the usage of the wireless network selection apparatus according to the second embodiment.

As shown in FIG. 8, it is assumed that there are two wireless networks (N1 and N2) connected in the ad-hoc mode around the wireless network selection apparatus 20. It is assumed that a process of registering the wireless network has been performed on the wireless network selection apparatus 20 in advance. Therefore, the wireless network selection apparatus 20 stores the connection setting information of the wireless networks N1 and N2.

In the wireless network selection apparatus 20, the display unit 24 displays the SSIDs, the PIN codes, and the additional information of all of the wireless networks that are provided in the vicinity of the wireless network selection apparatus 20. Specifically, the communication controller 26 determines whether there is a wireless network in the vicinity of the wireless network selection apparatus according to whether a beacon is received from the wireless network. When it is determined that there is a wireless network in the vicinity of the wireless network selection apparatus 20, the communication controller reads, for example, the SSID of the wireless network from the storage unit 23 and outputs it to the display unit 24. The beacon includes the SSID. Therefore, when the SSID in the beacon is identical to the SSID in the storage unit 23, the communication controller 26 reads various kinds of information related to the wireless network having the SSID from the storage unit 23 and outputs them to the display unit 24. A new user can determine a wireless network to which the user should be connected based on the information displayed on the display unit 24.

The new user selects the PIN code of a wanted wireless network at the position where the user can view the display unit 24 of the wireless network selection apparatus 20 and inputs a wanted PIN code to the user's wireless communication terminal. In this way, the wireless communication terminal transmits a probe request including information indicating the PIN code as a connection request to the peripheral wireless communication terminals (Step (21) in FIG. 4). The peripheral wireless communication terminal means a wireless communication terminal that transmits the beacon within a predetermined amount of time.

In the wireless network selection apparatus 20, the communication controller 26 receives the probe request through the WLAN interface 25. In addition, the communication controller 26 extracts the PIN code from the received probe request and determines whether the PIN code is identical to the PIN code displayed on the display unit 24. When the PIN codes are identical to each other, the communication controller 26 returns a probe response including information indicating that the PIN codes have been identical to each other to the wireless communication terminal of the new user through the WLAN interface 25 (Step (22) in FIG. 4). The wireless network selection apparatus 20 displays the PIN code and is in the same state as that in which the connection setting switch 11 is pushed.

Figure 9:
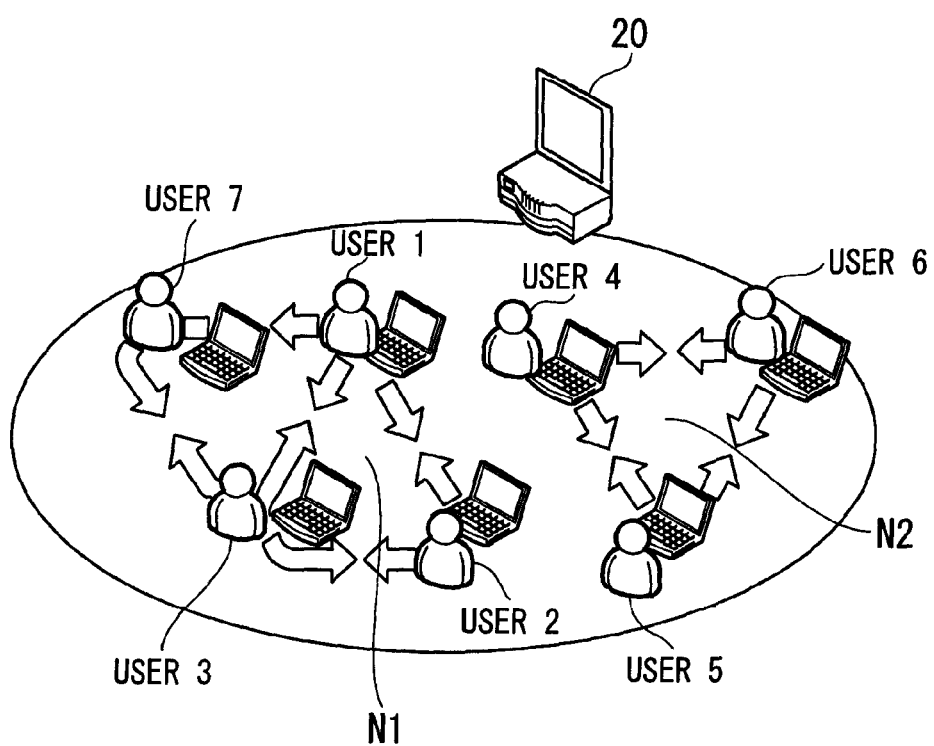
FIG. 9 is a network configuration diagram illustrating the usage of the wireless network selection apparatus according to the second embodiment.

Then, the wireless network selection apparatus 20 exchanges an encryption key (Steps (23) and (24) in FIG. 4) or performs authentication (Steps (25) and (26) in FIG. 4) based on the request from the wireless communication terminal of the new user. In addition, the wireless network selection apparatus 20 notifies the wireless communication terminal of the new user that authentication has been completed (Step (27) in FIG. 4) and transmits an EAPOL-Key including connection setting information corresponding to the PIN code that is identical to the PIN code on the display unit to the wireless communication terminal (Step (28) in FIG. 4). The wireless communication terminal of the new user receives the EAPOL-Key, acquires the connection setting information, and stores the acquired connection setting information in the internal memory. In this way, as shown in FIG. 9, the wireless communication terminal of the new user is connected as user 7 to the network N1.

Figure 10:
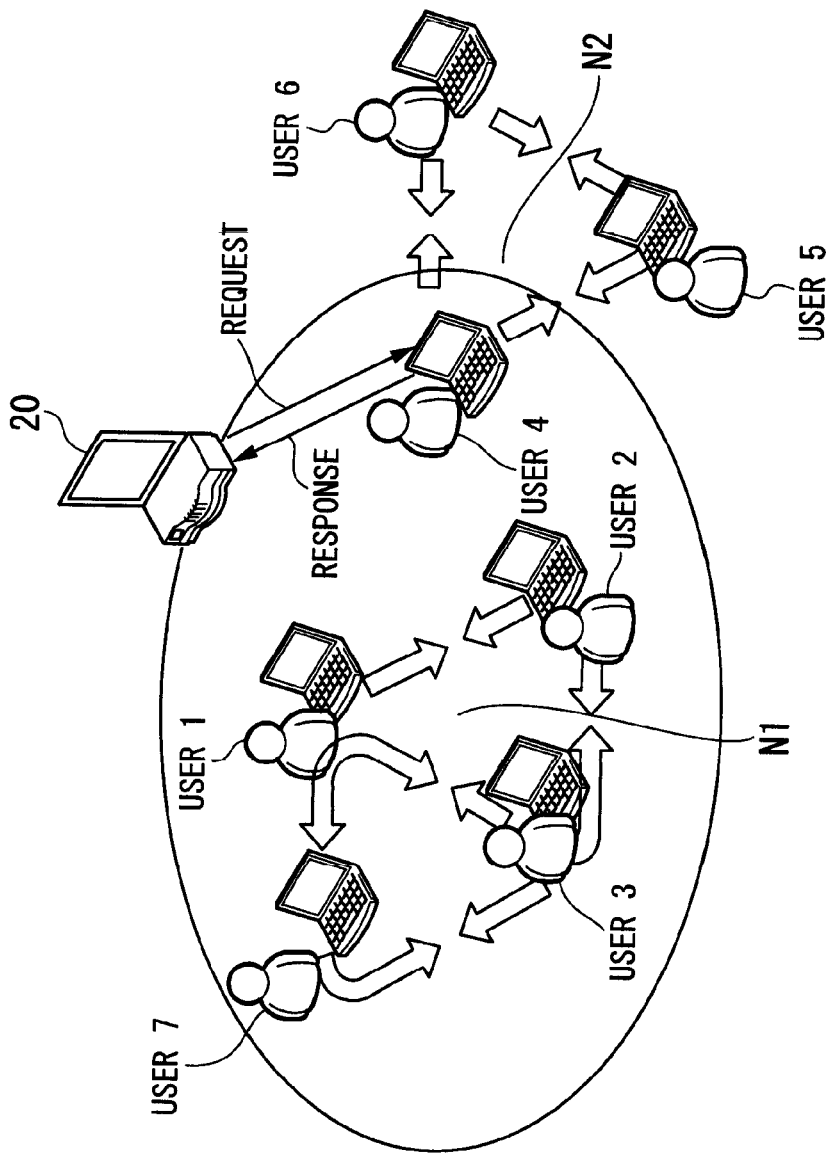
FIG. 10 is a network configuration diagram illustrating the usage of the wireless network selection apparatus according to the second embodiment.

Next, an operation when a wireless network that is not registered in the wireless network selection apparatus 20 appears in the communication range of the wireless network selection apparatus 20 will be described with reference to FIG. 10. It is assumed that there is a wireless network N1 in the vicinity of the wireless network selection apparatus 20 and the wireless network selection apparatus 20 displays the PIN code on the display unit 24 to invite participants to the wireless network N1. In this case, an operation when the wireless communication terminal of user 4 forming the wireless network N2 is within the communication range of the wireless network selection apparatus 20 is performed as follows.

When the wireless communication terminal of user 4 has a registrar function, it transmits the beacon. The wireless network selection apparatus 20 receives the beacon and detects whether there is a new wireless network based on the beacon. In addition, the wireless network selection apparatus 20 compares the SSID included in the beacon with the SSID stored in the storage unit 23 and determines whether a wireless network is registered based on the comparison result. When the SSIDs are not identical to each other, the wireless network selection apparatus 20 determines that the wireless network is not registered and issues a probe request. In FIG. 10, the wireless network selection apparatus 20 issues the probe request to the wireless communication terminal of user 4.

When user 4 wants to register the wireless network N1 in the wireless network selection apparatus 20, user 4 pushes the connection setting button of the wireless communication terminal or inputs the PIN code of the wireless communication terminal of user 4 to the wireless network selection apparatus 20. At that time, the wireless network selection apparatus 20 becomes an enrollee and the wireless communication terminal of user 4 becomes a registrar.

When the connection setting button of the wireless communication terminal of user 4 is pushed, the wireless communication terminal of user 4 transmits a probe response including information indicating the start of connection setting. When the PIN code is input to the wireless network selection apparatus 20, the wireless network selection apparatus 20 transmits a probe request including the PIN code. The wireless communication terminal of user 4 compares the PIN code included in the probe request with its own PIN code and transmits the probe response including information indicating the start of connection setting when the PIN codes are identical to each other. Then, the connection setting information of the wireless network N2 is transmitted from the wireless communication terminal of user 4 to the wireless network selection apparatus 20 by the above-mentioned operation.

The connection setting information of the wireless network N2 is registered in the wireless network selection apparatus 20. In this state, a process of inviting participants to the wireless network N2 is not performed. For example, the administrator of the wireless network selection apparatus 20 operates the information setting unit 22 to set the additional information of the wireless network or information indicating whether to perform a process of inviting participants to the wireless network, and the display unit 24 displays the PIN code and the additional information of the wireless network. In this way, the invitation of participants to the wireless network starts. In this case, it is possible to select whether to invite participants or not. When "do not invite participants" is selected, the wireless network selection apparatus 20 does not perform a process of inviting participants to the designated wireless network.

As described above, according to this embodiment, even though there is a plurality of wireless networks around the wireless communication terminal that wants to be connected to the wireless network, the wireless communication terminal can select a wanted wireless network in one place in which there is the wireless network selection apparatus 20 and perform connection setting. Therefore, the user does not need to find the wireless communication terminal of a wanted wireless network and perform connection setting. In addition, the user can connect the wireless communication terminal to a wanted wireless network only by inputting the PIN code, without performing a complicated input operation.

That is, according to this embodiment of the invention, the wireless network selection apparatus stores the connection setting information of a plurality of wireless networks and transmits the connection setting information to an external communication terminal in response to a request to transmit the connection setting information, such that the external communication terminal can acquire the connection setting information. Therefore, even though there is a plurality of wireless networks around an external communication terminal, the external communication terminal can select a wanted wireless network and be connected thereto.

The embodiments of the invention have been described above with reference to the drawings, but the detailed structure is not limited to the above-described embodiments. The design may be changed without departing from the scope and spirit of the invention. For example, the infrastructure mode and the ad-hoc mode are separately provided, but the two modes may be mixed. The connection setting may be input by a push button while the PIN code is displayed.

What is claimed is:

1. A wireless network selection apparatus including a processor comprising:

a memory which stores first connection setting information to join a first wireless network and second connection setting information to join a second wireless network which is different from the first wireless network;

a transmitter which transmits the first connection setting information or the second connection setting information to an external communication terminal;

a receiver which receives a request to transmit the first connection setting information transmitted from the transmitter and receives a request to transmit the second connection setting information transmitted from the transmitter;

a display which displays a first unique code corresponding to the first wireless network and displays a second unique code corresponding to the second wireless network;

a wireless network detector which detects a peripheral wireless network; and a switch, upon detecting a wireless network, sets connection setting information corresponding to the wireless network in the connection setting information stored in the memory such that the connection setting information is capable of being selected, wherein the memory stores the first unique code and the second unique code, the receiver receives a transmission request and a code from the external communication terminal, the transmitter, when the code received by the receiver is identical to the first unique code, transmits the first connection setting information to the external communication terminal, and the transmitter, when the code received by the receiver is identical to the second unique code, transmits the second connection setting information to the external communication terminal.

2. The wireless network selection apparatus according to claim 1, wherein the display displays the first additional information corresponding to the first wireless network, and the second additional information corresponding to the second wireless network.

3. The wireless network selection apparatus according to claim 1, wherein the display displays first additional information corresponding to the first wireless network and second additional information corresponding to the second wireless network, wherein the memory stores the first additional information and the second additional information, and the receiver receives the transmission request by detecting an operation of the user.

4. The wireless network selection apparatus according to claim 1, further comprising:

a connection switch which requests the external communication terminal forming a wireless network to transmit connection setting information of the wireless network and acquires the connection setting information, wherein the memory stores the connection setting information acquired by the connection switch as the first connection setting information or the second connection setting information.

5. The wireless network selection apparatus according to claim 1, wherein the first unique code and the second unique code are PIN codes.

* * * * *